Patented Nov. 25, 1952

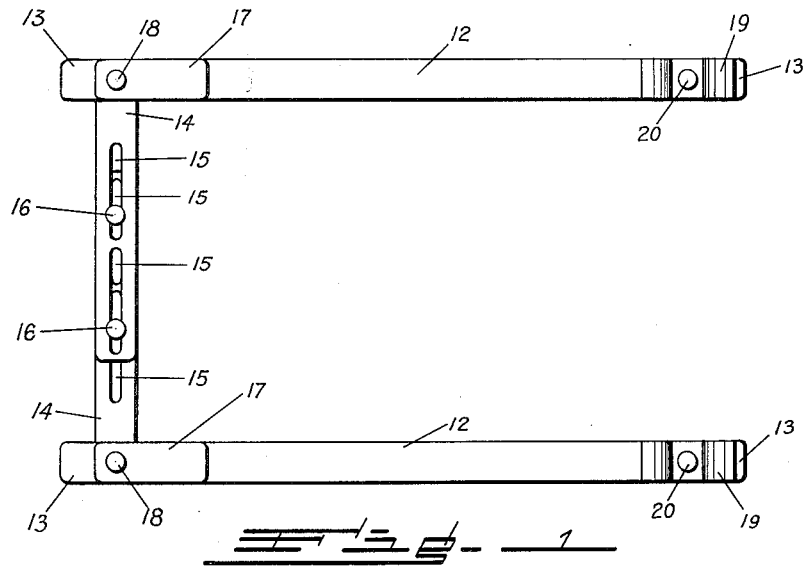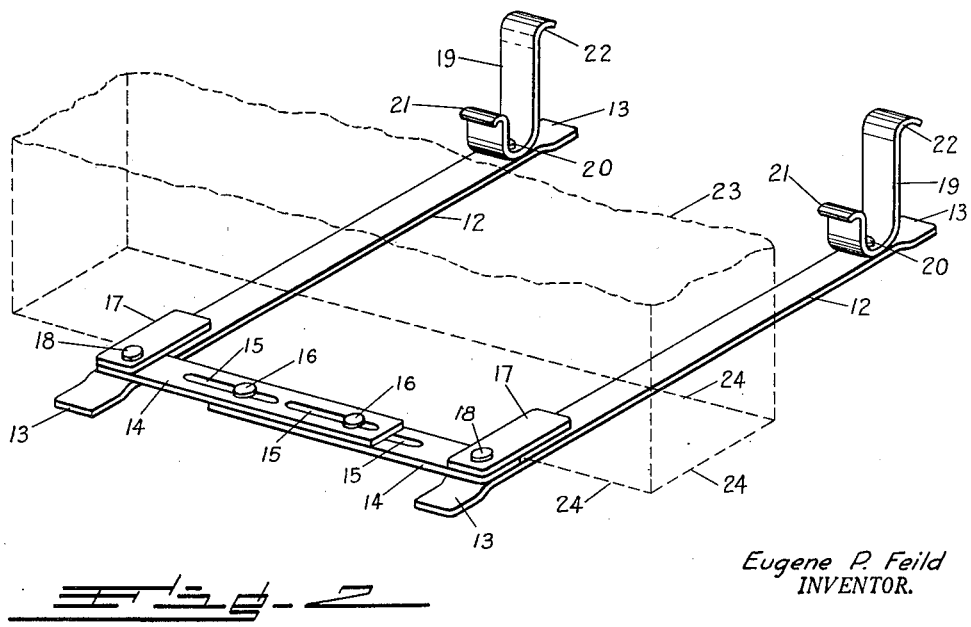

2,619,311

UNITED STATES PATENT OFFICE 2,619,311

CHASSIS SUPPORTING DEVICE

Eugene P. Feild, Colorado Springs, Colo., assignor to General Cement Mfg. Co., Rockford, Ill., a corporation of Illinois Application July 21, 1947, Serial No. 762,417

1 Claim. (Cl. 248—149)

This invention relates to a device and means for temporarily supporting or holding the chassis of a radio receiving set or other electronic or other sensitive apparatus.

In repairing or inspecting a radio receiving set or the like, it is frequently necessary to remove the chassis from the cabinet and in the course of such repairing or inspecting to position such chassis on an end or side. Because the chassis is usually not stable in any such position it becomes necessary, if the repairman or inspector is to have both hands free for work, to support or hold the chassis by means other than manual. These means should hold the chassis securely in an accessible position for the protection of the chassis parts, and should be easily and quickly operable, for economy of time. The use of anchored clamps, vises or the like does not satisfy all of these requirements.

The present invention has been designed to satisfy the above-mentioned requirements and consists of two basic support arms, preferably adjustably connected, to each of which bracket members are attached and so positioned that the space between each basic support arm and the selected bracket member thereon will admit the frame or other parts of the chassis.

To afford a better understanding of the present invention, reference will now be made to the accompanying drawings.

In the two drawings, in which like parts have been designated similarly,

Fig. 1 is a plan view of apparatus built according to the present inventive concept; and Fig. 2 is a perspective view of apparatus built according to the present inventive concept.

In the form of construction illustrated, the reference character 12 designates the two basic support arms, the ends of which are offset downwardly to form feet 13 upon which such basic support arms 12 rest.

The two basic support arms 12 are joined by a bridging member, preferably a two-part connecting arm 14, each part being slotted as shown at 15, and the arms 14 are held in slidable friction engagement by means of two suitable connecting members 16, which ride in the slots 15, and the heads of which are in slidable friction engagement with the top surface of one connecting arm 14 and the bottom surface of the other connecting arm 14. While I prefer the arrangement illustrated, it will be understood that the connecting members 16 may consist of double-headed pins, rivets, bolt and nut assemblies, or the like.

On the top surface of each connecting arm 14, at the end which is attached to the corresponding basic support arm 12, as shown at 18, there is attached a bracket member 17 which extends longitudinally parallel to the corresponding basic support arm 12 and in spaced relation to the arm. Any suitable fastening arrangement may be used for this purpose, such as a double-headed pin, rivet, bolt and nut, or the like. A J-shaped bracket member 19 is mounted for rotation at the free end of basic support arm 12 and is held by a connecting member 20, which may be a double-headed pin, rivet, bolt and nut, or the like. The end of the shorter upright portion of each J-shaped bracket member 19 is turned outwardly, thus forming a projecting ledge or lip 21, and the end of the taller upright portion is similarly shaped to form a projecting ledge or lip 22.

In the form of construction illustrated it will be seen that the space between each basic support arm 12 and its corresponding bracket member 17 is equal to the thickness of the attached connecting arm 14, which thickness should be slightly greater than the thickness of the material normally used for chassis frames. Thus, such space will admit the chassis frame, which is fixed in the holder by placing the chassis on the basic support arms 12 and then advancing the chassis along the basic support arms 12 in the direction of the bracket members 17, thereby inserting the chassis frame into the space between each bracket member 17 and the corresponding basic support arm 12. Figure 2 ilustrates by dotted line representation a chassis 23 with its frame 24 inserted, as above described, in the spaces between the bracket members 17 and the basic support arms 12. In this position the repairman or inspector is free to work on the chassis with both hands, for the chassis frame is held securely and firmly between the bracket members 17 and the basic support arms 12, and the weight of the chassis keeps the assembly from slipping when mounted on a flat supporting surface, such as a bench.

It will be apparent that, with the above-described construction, the connecting arms 14 permit such adjustment of the distance between the basic support arms 12 as may be necessary, in a simple and easy manner. It will also be apparent that the opposite ends of the basic support arms 12 need not be weighted down or fastened to the surface upon which they rest so long as the center of gravity of the chassis is so located that the chassis tends to bear in the direction of such opposite ends, as is usually the case when a chassis is installed in the holder in the manner above described.

In some instances, the above-described use of the invention will not be possible or feasible and it will be necessary or preferable to position the chassis at the opposite ends of the basic support arms 12 or necessary or preferable to insert the chassis in a space which is greater than that provided between a basic support arm 12 and an associated bracket member 17. For such occurrences, the J-shaped bracket members 19 are attached to the basic support arms 12 as above described. In this use of the invention, the chassis is placed on the basic support arms 12 and then advanced in the direction of the J-shaped bracket members 19 with such bracket members positioned as illustrated, thus inserting the chassis or a part of same in the spaces between the ledges or lips 21 and basic support arms 12. If such space is not adequate, either or both, as required, of the J-shaped bracket members 19 may be rotated, thus making available the larger space between the ledge or lip 22 and the basic support arms 12. Thus the chassis is again held securely and firmly, permitting the repairman or inspector to work on the chassis with both hands.

It will be apparent that this invention may be used with not only the chassis of radio receiving sets, but also the chassis of other electronic and other sensitive apparatus. From the foregoing, it will be apparent that the structural forms herein described and illustrated are well suited to practice the present invention, and it will be understood that changes and modifications may be availed of within the spirit and scope of the hereunto appended claim.

What I claim and desire to secure by Letters Patent is:

A holder for the chassis of radio receiving sets or the like, comprising support arms spaced apart having downwardly depending portions at the ends thereof to provide supporting feet, connecting arms having slots therein superposed on said support arms and attached thereto, fastening means extending through said slots for slidably connecting said connecting arms together, bracket members superposed on said connecting arms and above said supporting arms to provide a gap for the reception of a chassis surface, and a bracket member rotatably mounted upon each of said support arms at the end remote from said connecting arms, each of said members having a pair of spaced hook-like portions for selectively receiving and holding other chassis surfaces.

EUGENE P. FEILD.

REFERENCES CITED

The following references are of record in the file of this patent:

UNITED STATES PATENTS

| Number | Name | Date |
| --- | --- | --- |
| 431,485 | Rowland | July 1, 1890 |
| 1,481,137 | Lemke et al. | Jan. 15, 1924 |
| 2,030,775 | Twiss | Feb. 11, 1936 |
| 2,248,273 | Krajnc | July 8, 1941 |